United States Patent
Bauer et al.

(10) Patent No.: US 7,172,776 B2
(45) Date of Patent: Feb. 6, 2007

(54) DOUGH PRODUCT AND METHOD FOR MAKING SAME

(75) Inventors: Jay E. Bauer, Oakbrook, IL (US); Michael A. Alagna, Palatine, IL (US); Hugo Zavala, Addison, IL (US); Salvatore A. Selvaggio, Bartlett, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 208 days.

(21) Appl. No.: 10/046,457

(22) Filed: Oct. 25, 2001

(65) Prior Publication Data

US 2003/0082274 A1    May 1, 2003

(51) Int. Cl.
*A21D 8/02* (2006.01)

(52) U.S. Cl. ............... 426/19; 426/61; 426/62; 426/128; 426/496

(58) Field of Classification Search .......... 426/19, 426/61, 62, 128, 496, 523
See application file for complete search history.

(56) References Cited

U.S. PATENT DOCUMENTS

| | | | |
|---|---|---|---|
| 3,630,755 A * | 12/1971 | Schiffmann et al. | 99/90 |
| 3,767,421 A * | 10/1973 | Gulstad et al. | 426/532 |
| 4,308,286 A | 12/1981 | Anstett et al. | |
| 4,405,648 A * | 9/1983 | Atsumi et al. | 426/19 |
| 4,847,104 A | 7/1989 | Benjamin et al. | |
| 5,149,566 A | 9/1992 | Le Viet et al. | |
| 5,171,590 A | 12/1992 | Sluimer | |
| 5,207,151 A | 5/1993 | Le Viet et al. | |
| 5,354,566 A | 10/1994 | Addesso et al. | |
| 5,447,738 A | 9/1995 | de Bruijne et al. | |
| 5,624,697 A * | 4/1997 | Lin et al. | 426/241 |
| 6,010,325 A | 1/2000 | Lawrence | |
| 6,156,364 A | 12/2000 | Meibach | |

* cited by examiner

*Primary Examiner*—Lien Tran
(74) *Attorney, Agent, or Firm*—Fitch, Even, Tabin & Flannery

(57) ABSTRACT

The present invention provides an improved dough product. More specifically, the present invention provides an improved natural or self rising dough product or pizza crust formed by a process that provides: an improved method for manufacturing dough products; an improved method for packaging dough products; and an improved method for storing dough products.

12 Claims, 2 Drawing Sheets

DOUGH PRODUCT AND METHOD FOR MAKING SAME

BACKGROUND OF THE INVENTION

The present invention relates to improved dough products. More particularly, the present invention relates to an improved dough for pizza crust and a method for making the same.

Today's standards for manufactured dough products and in particular pizza dough products are high. The manufactured products are expected to rival hand made or pizzeria quality crusts. The marketplace desires, if not expects, pizza crusts to be "self-rising" or naturally rising. To be naturally rising, the dough must maintain live yeast that will consume sugars upon baking to produce the carbon dioxide ("$CO_2$") gas pockets that make the dough expand or "rise". To maintain live yeast, the manufacturer must control any heating of the dough so that it does not increase to 160° F. (71° C.), at which point the yeast rapidly dies.

Manufacturing dough products at low or ambient temperatures is difficult because the dough is moist and tacky and tends to adhere to whatever surface it contacts. This makes transferring the dough from one manufacturing step to another cumbersome and expensive. For instance, "cold-pressing" pizza dough is one known process for making formed, e.g., circular, pizza crusts. Cold pressing, however, requires each dough ball to be supported in a shaped pan, indexed under a press, and compressed. Removing the non-heated, compressed dough from the pan is difficult. The dough wants to stick to the pan. In many processes, the dough is heavily oiled, which adds cost, complexity and calories to the dough preparation. The pans also deform during the cold pressing process and must therefore be replaced periodically.

To overcome the problems associated with cold pressing, manufacturers have added heat to the pressing process. The heat imparts improved release characteristics to the dough product, however, the pizza crust has now been "hot pressed". As stated above, if the dough is heated to or above 160° F. (71° C.) for any significant length of time, the heat kills most or all of the yeast, whereby the dough no longer rises when finally cooked. If the dough is heated above 140° F. (60° C.) for any significant length of time, the dough becomes partially baked or "par-baked" as commonly termed in the industry. While "par-baked" dough products or pizza crusts will naturally rise to a certain extent, it is known that if first frozen and then refrigerated, par-baked crusts will no longer naturally rise.

Moreover, pressing a dough product to form a desired shape and thickness, whether cold or hot, has drawbacks. In many pressing operations, clearances or spaces between mating die plates, through machining or by design, can extrude or flash small amounts of dough around the edge of the desired shape. This is sometimes called "feathering," and it provides a clear indication that the crust has been manufactured. In some operations, dough leaking through die plates is severe enough that it must be collected and either placed back into a dough hopper or discarded.

Compression adds cost to and degrades the shape and predictability of the dough product. Compressed dough even after proofing is dense and its ultimate shape is less predictable than if the dough has not been compressed. Cutting and forming a dough piece or dough ball to be molded or compressed requires complicated and costly mechanical devices. Squeezing and flattening a dough ball into a desired shape will not produce as fine or as predictable a shape as would cutting or stamping a shape from an uncompressed sheet of dough.

Simply providing a raw dough product that has been cut into a desired shape does not provide a viable solution either. As stated above, raw dough is tacky and difficult to manufacture. It is also desirable to provide a dough product that has been properly proofed or developed. "Proofing" develops the dough by causing the yeast to begin to react and produce $CO_2$ leavening gas. During this process, the yeast culture grows using natural sugars such as dextrose for nutrients. The $CO_2$ gas causes the raw dough to increase in volume. The leavening process also improves the flavor and texture of the dough product.

Moreover, proper proofing at a desired temperature and humidity avoids premature activation of the yeast and other leavening agents commonly found in dough products. Subjecting raw, ambient temperature dough to too high a temperature may cause premature activation of the leavening agents. Premature activation may also cause the crust to crack. Otherwise, when a consumer attempts to bake the crust, it may cause the crust to crumble.

SUMMARY OF THE INVENTION

The present invention provides an improved dough product. More specifically, the present invention provides an improved natural or self rising dough product or pizza crust formed by a process that provides: an improved method for manufacturing dough products; an improved method for packaging dough products; and an improved method for storing dough products. To this end, in one embodiment of the present invention the improved dough product includes a skin that is produced by a superproofing step. The superproofing step is provided in addition to a known proofing step. The proofing step develops the dough and heats it to a first temperature. The superproofing step quickly heats the dough from the first temperature to a second temperature. The first temperature is in one embodiment about 110° F. to 112° F. (43.3° C. and 44.4° C.), and the second temperature is in one embodiment 140° F. to 145° F. (60.0° C. to 62.8° C.).

Raising the temperature of the proofed dough to the second temperature in a relatively short period of time provides a skin that enables the improved dough product to be readily lifted or removed from a conveying pan. It also enables the improved dough product to be shaped by a process other than pressing, e.g., by cutting or stamping. Cutting or stamping a dough product into a desired shape does not leave marks of mass production found with pressing a dough ball into a desired shape.

Because the temperature of the superproofed dough does not in a preferred embodiment rise above 145° F. (62.8° C.), the yeast maintained within the improved dough product remains active and alive. As such, the improved dough product is self-rising or naturally rising. It has been found that the improved dough product can be unfrozen and saved in a refrigerated state for a period of up to five days before baking, whereupon the improved dough product still self-rises.

The process for making the superproofed dough product includes the step of procuring the proper ingredients. Due to the extra proofing step, one or more dough strengtheners such as gluten, ascorbic acid and/or baking powder may need to be added or increased from its normal percentage. The dough strengtheners support the cell walls of the open cell dough product, which are created by the $CO_2$ gas from the leavening process. The ingredients of the improved dough product otherwise include known ingredients for yeast leavened bread, such as flour, water, salt, sugar, yeast and shortening.

The dough ingredients are mixed and formed into a bulk mass. An extruder extrudes the bulk mass into a sheet of dough that is approximately 4 to 5 millimeters (0.16 to 0.20 inch) thick. The sheeted dough is cut into desired dough shapes. The cut shapes are placed on a pan and conveyed through one or more proofing houses or proofers. The proofers foster the chemical process that produces the $CO_2$ gas, and the improved dough product expands, e.g., up to 50% of its original thickness. The proofers are maintained at a fixed temperature and are set to have as low a humidity as possible, e.g., ambient humidity. The proofed dough pieces are then sent through a superproofing machine of the present invention. The superproofing machine rapidly heats the dough product to a temperature below that which will kill the active yeast in the dough, but which will place a skin on the dough to remove its tackiness. After the improved dough product is superproofed, it may be readily lifted off of the conveying pan, frozen, packaged and sent to market.

It is therefore an advantage of the present invention to provide a naturally rising dough product or pizza crust, which is airy and uncompressed.

It is another advantage of the present invention to provide a naturally rising dough product or pizza crust, which does not have flashing or feathering commonly produced by compression.

It is a further advantage of the present invention to provide a naturally rising dough or pizza crust product having an improved texture.

It is still another advantage of the present invention to provide a naturally rising dough product or pizza crust that is readily panned and depanned.

It is still a further advantage of the present invention to provide a naturally rising dough product or pizza crust that does not require vacuum packaging.

It is yet another advantage of the present invention to provide a naturally rising dough product or pizza crust that does not require modified atmosphere packaging.

It is yet a further advantage of the present invention to provide a naturally rising dough product or pizza crust that may be stored in a refrigerator rather than a freezer.

Moreover, another advantage of the present invention is to provide a naturally rising dough product or pizza crust that has been proofed or properly developed.

Additional features and advantages of the present invention will be described in, and apparent from, the following Detailed Description of the Preferred Embodiments and the Drawings.

DETAILED DESCRIPTION OF THE PREFERRED EMBODIMENTS

Figure 1:
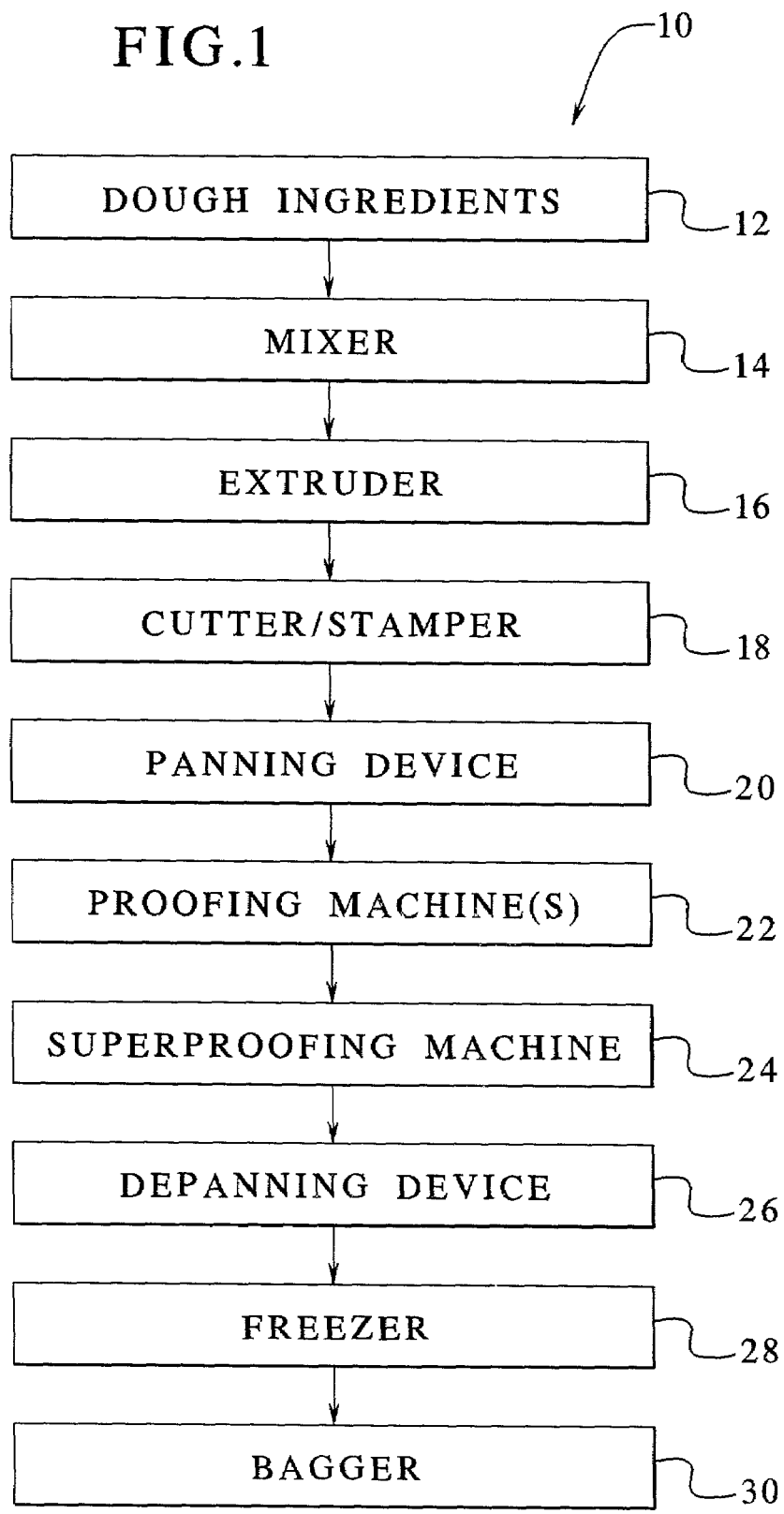
FIG. 1 is a process flow diagram of one embodiment for making the improved dough product of the present invention.

Referring now to the drawings and in particular to FIG. 1, one embodiment of a process 10 for making the improved dough product of the present invention is illustrated. A first step in the process 10 includes obtaining the necessary dough ingredients 12. The dough ingredients 12 include any known ingredients for making pizza dough, foccaccia dough, or any other type of dough that is typically cut, pressed or stamped into a desired shape. The dough ingredients 12 of the present invention therefore include flour, water, shortening, sugar, yeast, and salt, as well as other ingredients.

As will become apparent, the present invention includes an extra superproofing step. Therefore the dough ingredients 12 preferably include a dough strengthening agent. The dough strengthening agent can include one or more of an additional amount of gluten, ascorbic acid or baking powder. The dough ingredients 12 may include any combination of these. In a preferred embodiment, the dough ingredients 12 include about 2–10% gluten and most preferably about 5% gluten. The dough ingredients 12 include up to 0.1% ascorbic acid and most preferably about 0.02%. The dough ingredients 12 also include up to 1% baking powder and most preferably about 0.6% baking powder. It should be appreciated, however, that many other dough ingredient formulas may be adapted using one or more or all of these dough strengthening agents. Further alternatively, the dough ingredients 12 may include a high protein flour and/or chemical leavening agents.

After the dough ingredients 12 are procured, the dough ingredients are mixed in a mixer 14. The mixer 14 mixes a bulk quantity of dough by mixing the flour, water, yeast, sugar, e.g., dextrose, and salt. In an embodiment, the flour is an enriched high gluten wheat flour. In an embodiment, the flour is unbleached and unbrominated.

The salt in an embodiment is sodium chloride, which can be replaced by a suitable substitute. The yeast in an embodiment is baker's yeast, which may be either fresh yeast or compressed yeast. The sugar is preferably dextrose, however, the sugar can be sucrose or any other sugar suitable for baking a yeast leavened bread product. For example, corn syrups having glucose, maltose, fructose, maltodextrins, dextrins, and/or oligo saccharides may be employed.

Other optional ingredients may be added such as edible oils, vegetable extracts, concentrates or powders, and/or cheese. The extracts include, among others, garlic and onion power and the cheeses include, among others, parmesan, romano, cheddar and/or mozzarella. The shortening may be any shortening suitable for making yeast leavened dough.

The mixer 14 mixes the dough ingredients 12 in a conventional fashion as is well known in the art. The water is mixed in an amount that sufficiently hydrates all of the flour. The dough mixer 14 may be any mixer known to those of skill in the art. For example, the mixer may be a Peerless Mixer, Model Number HS16FD. Mixing takes place in the mixer 14 until the ingredients 12 are uniformly and substantially homogeneously mixed.

After the dough is mixed, the dough is placed in a hopper and fed into an extruder 16. The extruder 16 may be any extruder known to those of skill in the art. The extruder includes various sets of rollers each of which reduce the height or thickness of a sheet of dough, which is approximately three to four feet (0.91 to 1.22 m) wide. In an embodiment, one or more sets of rollers may be adapted to reduce the height or thickness of the dough sheet by approximately 20%. Eventually, the thickness of the dough sheet is reduced to approximately three to four millimeters (7/64 to 5/32 inch).

The extruder 16 includes an apparatus that applies flour to the top of the dough sheet. The extruder 16 also places flour on its conveyor. In this manner, the extruder 16 applies flour to both sides of the sheeted dough. The extruder 16 applies the flour to the dough sheet at some point during the stepping down of the thickness of the sheet by the various sets of rollers.

The thin sheet of dough is then conveyed to a cutter or stamper 18, collectively referred to herein as the "cutter". The cutter 18 separates the dough sheet into desired dough shapes. For example, the cutter 18 can cut circular pizza crusts in various diameter sizes, such as 8 inch (20.3 cm), 10 inch (25.4 cm), 12 inch (30.5 cm), 16 inch (40.6 cm), as well as other sizes. Other end products, such as foccaccias and other shaped breads, may have different sizes and different shapes. Importantly, as will be illustrated later, the cutter 18 does not compress the separated or shaped portion of the sheet. Any remaining dough of the sheet that is not cut or separated into a desired shape is preferably returned as scrap dough to the hopper and recycled into fresh dough.

After the desired dough shapes are cut or stamped, the dough is conveyed to a panning device 20. The panning device 20 may be any panning device known to those of skill in the art. The panning device 20 places the dough shapes onto pans. The panning device may be adapted to place a single dough shape on a single pan or multiple dough shapes on a single pan.

After the panning device 20 places the dough shapes onto pans, the pans are conveyed into one or more proofing machines or proofers 22. One suitable proofer is a spiral proofer made by Northfield. In an embodiment, multiple proofers 22 may be serially linked so that the proofing time for the dough shapes may be increased. Multiple proofers 22 also enable the manufacturer to use one proofer for certain types of dough products and two or more proofers for other types of dough products. The one or more proofers 22 include an enclosure that controls temperature and humidity. In one embodiment, the temperature of the proofer 22 is set to 110° F. (43.3° C.). The humidity in an embodiment is desired to be zero humidity, which in practicality means that the humidity is the ambient humidity. In an embodiment, the proofer 22 heats the dough products of the present invention at its set temperature and humidity for approximately twenty to about fifty minutes and preferably for about forty to forty-five minutes.

If possible, one proofer 22 is employed. Otherwise, if the required proofing time exceeds that of a single proofer, two or more proofers 22 are employed. The length and speed of the conveyor of the proofer 22 as well as the particular dough product affect the need for more than one proofer 22. A single proofer 22 is sufficient for some dough products, while others require multiple proofers.

Proofing, as is well known in the art, develops the raw dough shape or product. That is, proofing allows the yeast to absorb nutrients from the sugar, e.g., from the dextrose. This begins the chemical process of leavening that makes the raw dough expand and also improves the taste of the raw dough.

Leavening enables a yeast culture to grow, wherein the yeast obtains nutrients from the sugar and gives off $CO_2$ gas. The $CO_2$ produces gas pockets within the raw dough causing the raw dough to rise or expand. It is important that the temperature in the proofer 22 is maintained so that the dough does not rise too quickly. If the dough rises too quickly, the gas pockets will have walls that will not support the weight of the dough, wherein the dough collapses. The proofers 22 are therefore preferably maintained below 130° F. (54.4° C.), more preferably at or below 120° F. (48.9° C.) and most preferably between 110° F. and 112° F. (43.3° C. and 44.4° C.). The raw dough therefore enters the one or more proofers 22 at ambient temperature and exits the proofer after about forty to forty-five minutes at approximately 108° F. to 112° F. (42.2° C. to 44.4° C.). As a result of the proofing step, the raw dough shape or product, by visual inspection, may appear to have gained approximately 50% in volume. That is, the proofed dough pieces may have a thickness of approximately 4.5 to 6 millimeters (3/16 to 1/4 inch).

After the dough product has been proofed in the one or more proofers 22, the product is conveyed on a pan to a superproofing machine 24 of the present invention. The improved dough product of the present invention has been successfully superproofed using different ovens. The present invention therefore includes each embodiment produced by the different superproofing ovens. One machine 24 that has been used in a production environment is a Meincke Turbo Oven, 9-zone, Model No. 200. This superproofing machine includes multiple zones, e.g., nine zones, wherein the dough producer sets different temperatures in the different zones.

The superproofing step using any machine 24 includes searing the proofed dough product, i.e., heating the proofed dough product at a higher temperature for a relatively short period of time, so that a skin forms on the outside of the dough product. The dough product is preferably quickly heated from its proofed temperature to a temperature of about 120° F. to 160° F. (48.8° C. to 71° C.) and preferably to about 140° F.–145° F. (60.0° C.–62.8° C.). Using the multi-zone superproofing machine 24, the superproofing step has been successfully achieved by shutting down the first three zones, maintaining zone four at between 300° F. and 400° F. and preferably about 350° F. (between 148.8° C. to 204.4° C. and preferably about 176.7° C.). Zone five has been maintained from between 400° F. to 600° F. (204.4° to 315.6° C.). Zones six through nine, like zones one through three, have also been turned off, i.e., the burners for these zones are not energized.

Heating the middle of the multi-zone superproofing machine 24 enables the proofed dough product at approximately 110° F. to 112° F. (43.3° C. to 44.4° C.) to enter a pre-heating stage of the superproofing machine 24. The initial one or more zones, while not heated, pick up some of the heat from the middle heated zones. The initial zones may or may not power and run their cooling fans. In either case, the initial zones preheat the proofed dough product before it enters heated zones four and five. It is believed that the initial zones serve to further proof and develop the dough product and serve to begin the formation of the superproofed skin of the present invention.

The heated zones are maintained at temperatures well above the temperature needed to destroy the activity of the yeast within the dough, however, the dough product only encounters these temperatures for a short period of time. Therefore, it is believed that some of the yeast on the superproofed skin may become inactive, however, the yeast maintained within the interior of the dough remains active and alive. In this manner, the improved dough product of the present invention naturally rises or self-rises when finally cooked.

The dough product in the multi-zone embodiment conveys through the heated zones four and five in less than five minutes, preferably less than 2½ minutes, and in one most preferred embodiment in about 2 minutes. The time that the dough product spends in zones four and five is apportioned approximately equally so that the dough product sees the lower temperature of zone four for one-half the time and the upper temperature of zone five for one-half of the time. It is believed that the precise temperatures and times for contacting the heating zones may be altered depending upon the formulation of the dough ingredients 12. Further, while successful results have been obtained using the above-described temperature profile for the multi-zone superproofing apparatus 24, it is believed that other profiles would also provide suitable results.

The non-heated zones six through nine, which follow the heated zones four and five, apply power to and run their associated cooling fans but do not power their burners. It is believed that these latter zones serve to dry and cool the skinned superproofed product to further reduce the tackiness and stickiness of the final product.

The superproofed skin provides a number of advantages as detailed above. The skin, which is believed to be substantially formed by the end of the fifth zone, enables the superproofed dough product to be readily lifted or removed from its conveying pan. Another primary advantage is that the superproofed dough product has been cut or stamped into its shape, rather than pressed.

Although the multi-zone superproofing machine 24 has provided a dough product having a skin that achieves these advantages, it is believed that the superproofing step may be altered without significantly degrading the skin. For example, the present invention includes providing a combination proofer 22 and superproofing machine 24 that performs both functions. This machine may be adapted to include or alternatively not include the initial unheated zones. In such a case, proofing the dough to approximately 110° F. to 112° F. (43.3° C. to 44.4° C.) and then immediately heating the product with the elevated superproofing temperatures produces a satisfactorily superproofed product. This combined proofer 22 and superproofing machine 24 may or may not include the unheated zones after the skin is applied.

The combined proofer and superproofer, however, can include a drying portion after the dough products pass through the elevated superproofing temperatures so as to further dry the product and cool it before depanning. The success of a combined superproofing machine 24, which does not include a pre-heat step between proofing and superproofing is supported by results that have been achieved in a single-zone oven.

In this single-zone superproofing machine 24 embodiment, the improved dough product has been first proofed substantially as described above in connection with the proofing machine 22. In this embodiment, however, the superproofing step has included immediately placing the proofed dough product into the single-zone superproofing machine 24, which is set at an elevated temperature of between 350° F. to 600° F. (148.8° C. to 315.6° C.). In this latter embodiment, successful results have been achieved by heating the proofed dough at a single elevated temperature. Thus, while pre-heat zones and multiple high temperature zones have produced successful results, providing no pre-heat and only a single high temperature zone has also successfully produced a superproofed product.

It is therefore contemplated that many different temperature settings and heating periods may be employed as long as the temperature of the superproofed dough does not exceed 160° F. and preferably does not exceed 140° F. to 145° F. (60.0° C. to 62.8° C.). That is to say, the present invention includes any temperature profile in combination with any suitable heating time, e.g., less than five minutes, which produces this effect. The superproofing step in a preferred embodiment therefore includes raising the temperature of the proofed dough product from approximately 110° F.–112° F. (43.3° C. to 44.4° C.) to approximately 140° F. to 145° F. (60.0° C. to 62.8° C.).

The superproofed dough product is thereafter conveyed to a depanning device 26. One example of a suitable depanning device is a Capway Crust Depanner. In general, the depanning device 26 may be any device that is adapted to lift or remove the dough products from their pans. In one embodiment, depanning device 26 includes a plurality of suction cups that momentarily contact an upper surface of the superproofed dough product. The skin on the superproofed dough product enables the suction cups to exert a negative pressure on the upper surface of the dough product to momentarily couple the dough product to the suction cup. The dough product remains coupled to the suction cups until the cups move to a drop-off area whereby the negative pressure is removed and the superproofed dough product falls from the suction cup.

It should be appreciated that the suction cups would suck portions of raw dough from a raw or merely proofed dough product, removing portions of the product while leaving the remainder on the pan. In essence, without the skin provided by the superproofing machine 24, lifting the dough product becomes very difficult. These suction cups by way of example illustrate one of many possible methods of removing the superproofed dough product from the pan. Any method, including sliding a spatula like device underneath the dough product, is aided by the skin and its non-tacky and non-sticky characteristic. Although the superproofing machine 24 is of most benefit to a sheeting operation, that is, one employing pans, the superproofing step and its resultant skin would still benefit a hot pressed method of producing a self-rising dough crust because the dough product is cut or stamped and not compressed.

After depanning, the superproofed dough product of the present invention is conveyed to a freezer 28, which freezes the dough product. Once frozen, the improved dough product may remain frozen for a substantial period of time, e.g., 90 days. It has also been found that the superproofed dough product may be warmed from a frozen condition to a refrigerated condition and thereby stored in a refrigerator for up to 5 days. This provides a substantial benefit to restaurants, supermarkets, consumers and other purchasers of the improved dough product. For example, most self-rising or naturally rising dough crusts if unfrozen for any significant period of time will not self-rise upon cooking. This means the known self-rising crusts must be thawed and immediately cooked. With the improved dough crust of the present invention, one can thaw a superproofed dough product, top it, return it to the refrigerator and bake the topped dough product at a later time. Supermarkets and especially delis contained therein can display topped or completed pizzas or foccacias that are refrigerated rather than frozen.

Another advantage of the present invention is that it does not need to be packaged in a modified atmosphere, e.g., under costly nitrogen or carbon dioxide. The superproofed dough product of the present invention may simply be placed, preferably while frozen, in a bag under atmospheric conditions, boxed and shipped. The improved dough product is therefore illustrated as being conveyed to a bagger 30.

Figure 2:
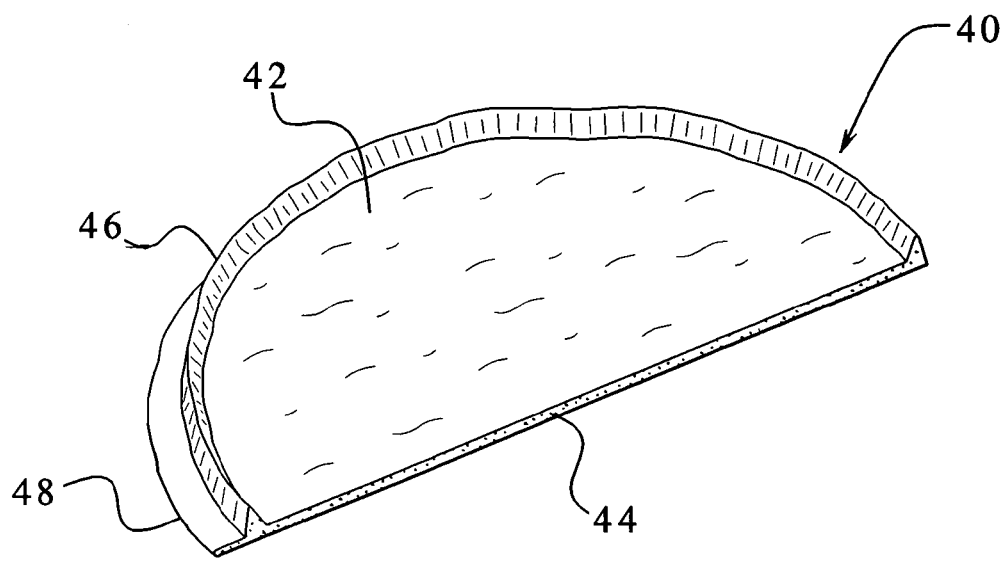
FIG. 2 is a section of a perspective view of a known hot pressed dough product.
Figure 3:
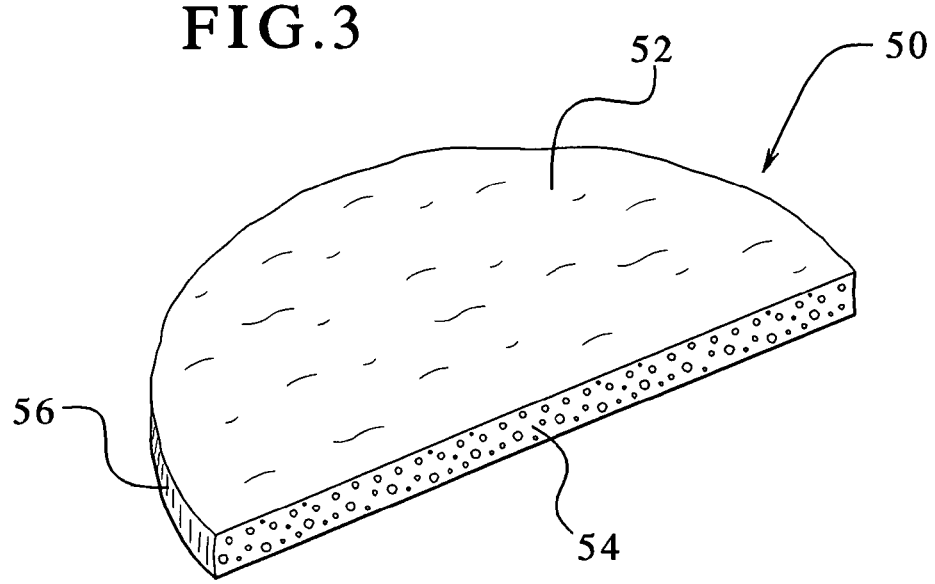
FIG. 3 is a section of a perspective view of the improved pizza dough made via the process described in connection with FIG. 1.

Referring now to FIGS. 2 and 3, a known uncooked self-rising dough product 40 is shown in comparison with an uncooked superproofed improved dough product 50 of the present invention. A number of differences are readily apparent. The known dough product 40 has a topside 42, which has been compressed so that the thickness 44 of the known product 40 is thin, dense and tightly packed. The known dough product 40 may or may not have a ridge 46. The ridge 46 is illustrated here to distinguish the flashing and feathering 48 from the top surface 42.

When the known product 40 is hot pressed through a known method, the hot pressing often produces dough flashing or feathering 48 through clearances caused by design or imperfection in the die plates of the press. The feathering or flashing 48 provides an easily discernable sign that the crust has been mass produced. The flashing or feathering 48 is also wasteful and may require a separate step of collecting the excess dough and returning it to the dough hopper.

The improved dough product 50, on the other hand, is not compressed on its top surface 52. The thickness 54 of the improved dough product 50 is therefore uncompressed and appears more airy and light. The thickness 54 contains an open cell structure as opposed to the closed or compressed cell structure of the thickness 44 of the compressed product 40. Moreover, the improved product 50 shows no signs of mass production. The product 50 can also be made rounder or be made to conform to another desired shape more readily than by squeezing a dough ball and relying on pressure to fill an entire cavity created by mating die plates.

It should be understood that various changes and modifications to the presently preferred embodiments described herein will be apparent to those skilled in the art. Such changes and modifications may be made without departing from the spirit and scope of the present invention and without diminishing its attendant advantages.

We claim as our invention:

1. A process for preparing a dough product comprising the steps of:
   proofing, which includes heating a quantity of dough in a temperature controlled environment for a first amount of time so that yeast within the dough quantity produces $CO_2$ gas and so that the dough quantity expands;
   superproofing, which includes further heating the dough quantity to a temperature of more than 140° F. and less than 160° F. (71° C.) in a second amount of time, wherein the second amount of time is less than five minutes; and
   packaging the dough quantity without further heating.

2. The process of claim 1, wherein the step of proofing includes heating the dough quantity to less than 120° F. (49° C.).

3. The process of claim 1, wherein the step of proofing includes maintaining the dough in a humidity controlled environment.

4. The process of claim 1, wherein the steps of proofing and superproofing are performed in different pieces of equipment.

5. The process of claim 1, wherein the steps of proofing and superproofing are performed in a single piece of equipment.

6. The process of claim 1, wherein the step of superproofing is performed in an oven having a plurality of zones, at least one zone heating the dough quantity and at least one zone drying the dough quantity.

7. The process of claim 6, wherein at least one zone pre-heats the dough quantity before and at least one zone dries the dough quantity after the at least one zone heats the dough quantity.

8. The process of claim 1, wherein the step of superproofing is performed while the dough quantity is conveyed on a pan.

9. The process of claim 8, which includes the step of lifting the dough quantity from the pan after the step of superproofing the dough quantity.

10. The process of claim 1, which includes the step of mixing the dough quantity before the step of proofing, wherein mixing includes adding at least one dough strengthener selected from: gluten, ascorbic acid and baking powder.

11. A process for preparing a self-rising dough product comprising the steps of:
    heating a quantity of dough in a temperature controlled environment for a first amount of time to less than 120° F. (49° C.) so that yeast within the dough quantity produces $CO_2$ gas and so that the dough quantity expands;
    further heating the dough quantity to between 140° F. (60° C.) and 160° F. (71° C.) in a second amount of time, wherein the second amount of time is less than five minutes; and
    freezing the dough quantity.

12. The process of claim 11, which includes the step of storing the dough quantity in refrigerator and thawing the frozen dough quantity to a refrigeration temperature.

* * * * *